United States Patent Office 2,859,529
Patented Nov. 11, 1958

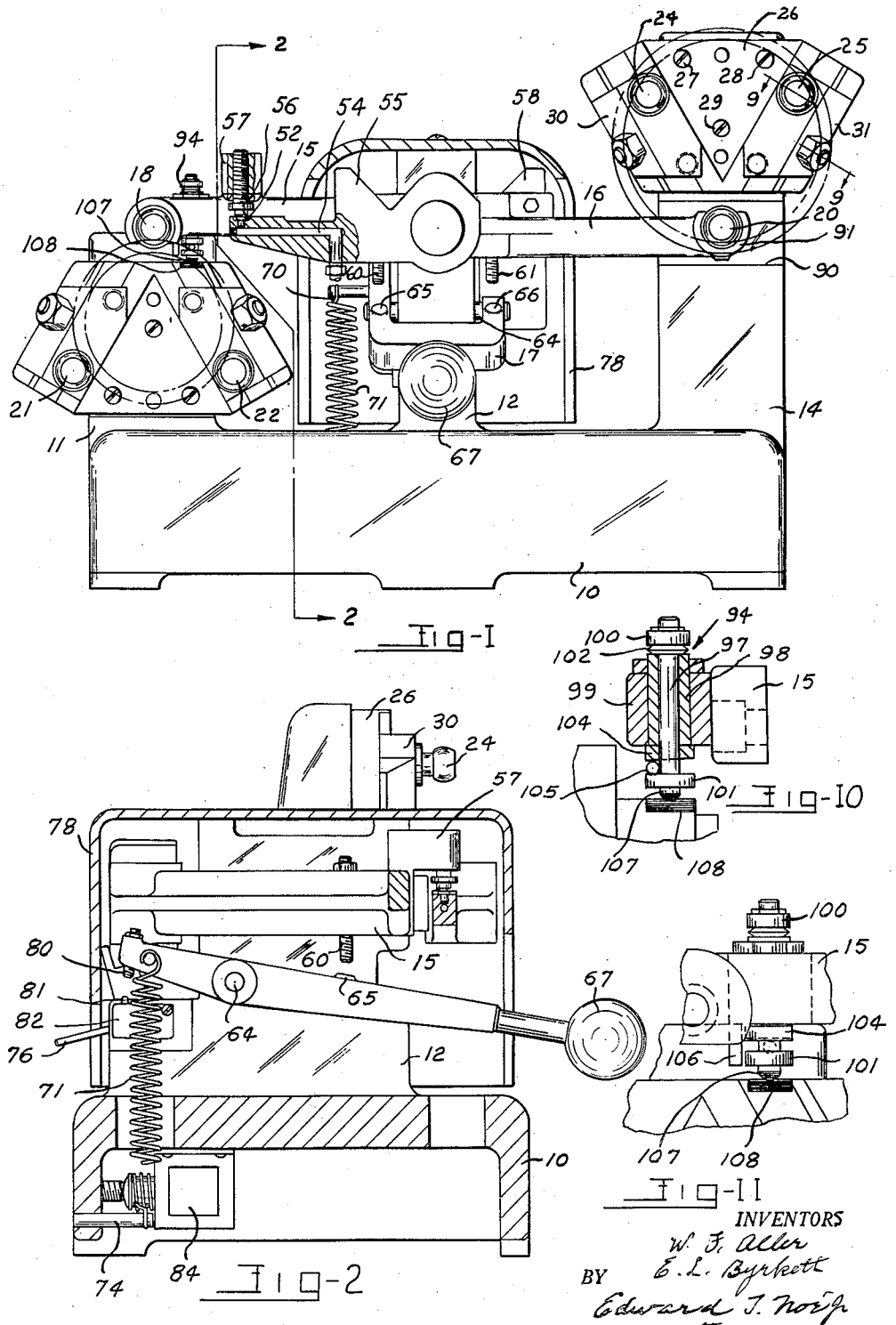

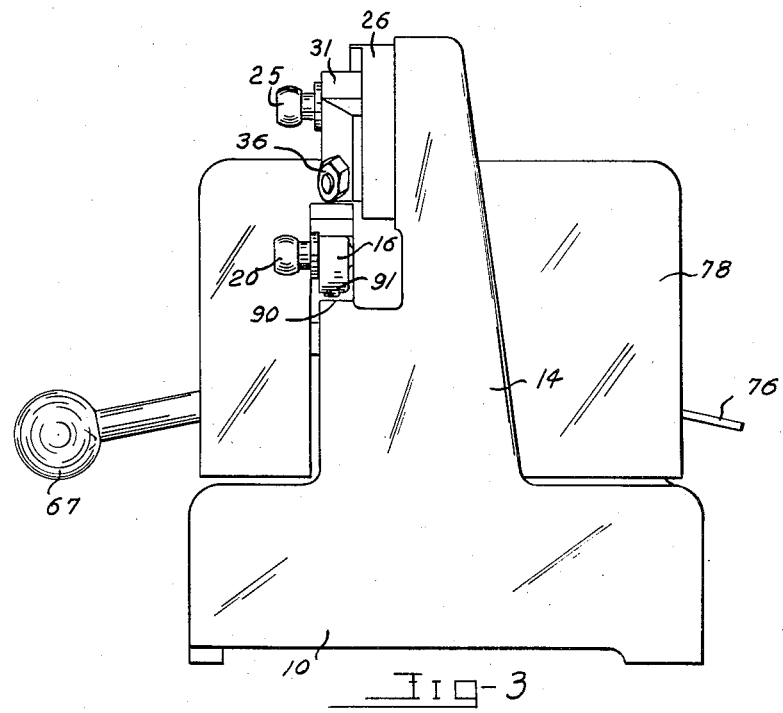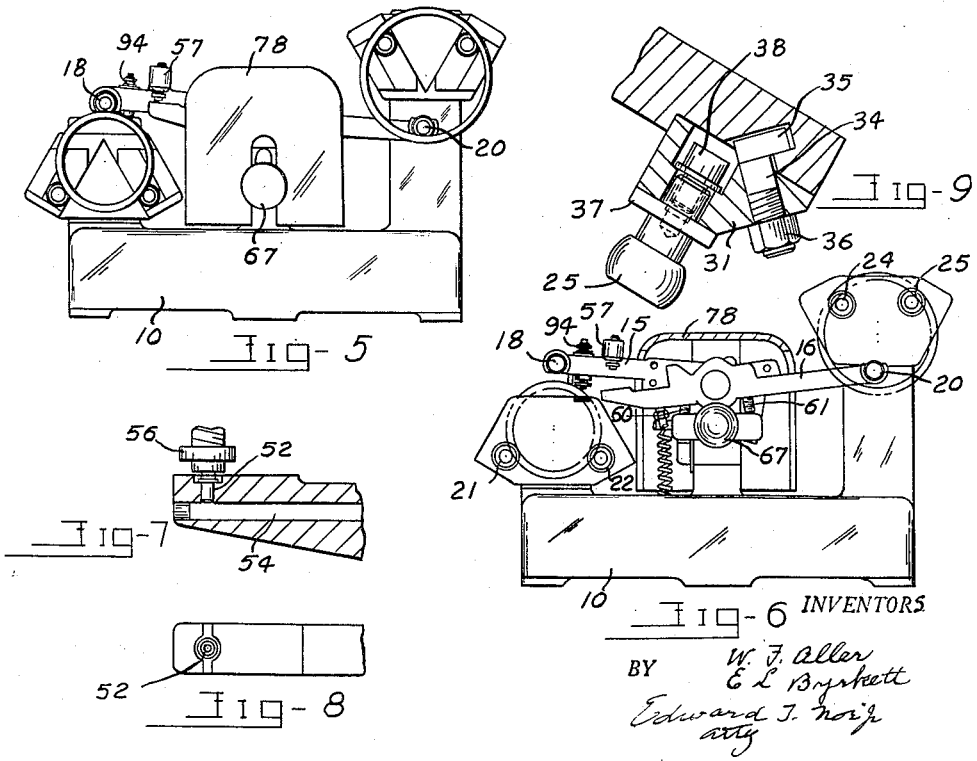

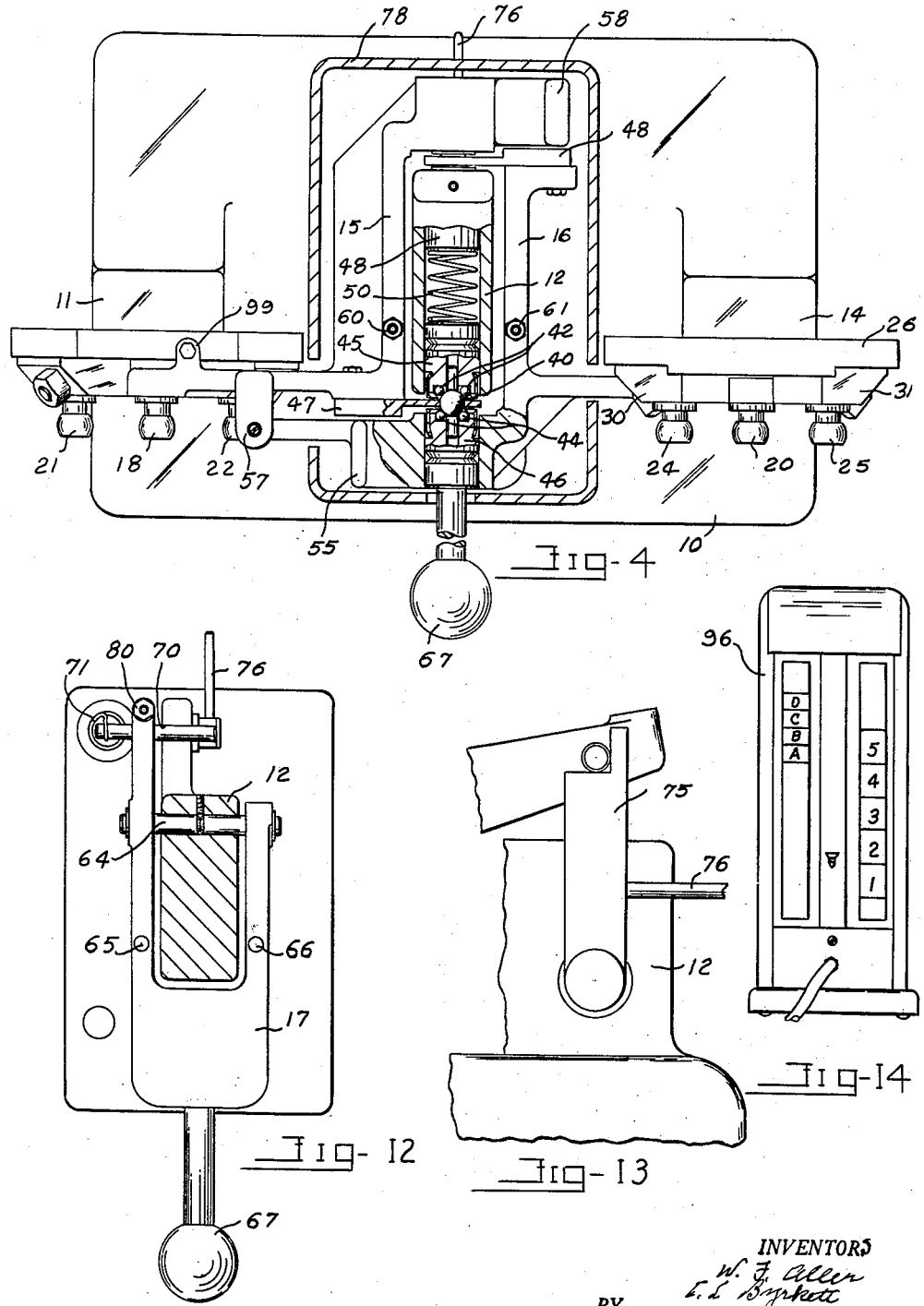

2,859,529

GAUGING DEVICE

Willis Fay Aller and Elwood L. Byrkett, Dayton, Ohio, assignors, by mesne assignments, to The Sheffield Corporation, a corporation of Delaware Application November 2, 1953, Serial No. 389,727

3 Claims. (Cl. 33—174)

This invention relates to precision gauging apparatus.

One object of this invention is to provide a gauging apparatus adapted for precisely gauging the dimensional relationship between cooperating parts such as the inner and outer ring race diameters of antifriction bearing components and which will give repeated accurate gauging through a long service life.

It is a further object to provide a gauging apparatus for gauging the dimensional relationship between an inner surface of an outer part and an outer surface of an inner part comprising mechanical means for contacting the inner and outer surfaces respectively, and positioned thereby, and gauge means cooperating between said mechanical means for determining the dimensional relationship involved.

Another object is to provide a precision gauging apparatus which is adapted to determine the precise size of a single part or for comparing the dimensions of a plurality of cooperating parts.

It is further object to provide a gauging apparatus wherein a pair of cooperating gauging components are relatively positioned in a gauging operating in accordance with dimensional relationship between a pair of parts and which is readily adapted for gauging a single part by locating one of the components in a reference position and positioning the other component in accordance with the dimension of the single part to be gauged.

It is a further object to provide a gauging apparatus wherein parts are easily placed for gauging and removed following a gauging operation, which is adapted for gauging cooperating parts of a wide range of part sizes.

Other objects and advantages of the present invention will be apparent from the following description, the accompanying drawings and the appended claims. A detailed description of a specific embodiment for carrying out the present invention will be given with reference to the accompanying drawing figures wherein similar parts have been given similar designations.

Figure 1 illustrates in front elevation and in partial section an exemplary apparatus embodying the present invention.

Figure 2 is a sectional view of the apparatus taken on line 2—2 of Figure 1.

Figure 3 is a view of the right-hand end of the apparatus.

Figure 4 is a top view, also in partial section.

Figures 5 and 6 illustrate the gauging apparatus in gauging and loading positions respectively with the central housing broken away in Figure 6.

Figure 7 is a central section of the fluid leakage orifice and the passage leading to it through one end of a gauging arm, and the opposed orifice controlling surface, constituting the gauging components in this exemplary embodiment.

Figure 8 is a fragmentary view of the end of the gauging arm carrying the fluid leakage orifice.

Figure 9 is a sectional view of one of the adjustable work supporting contacts taken on line 9—9 of Figure 1.

Figure 10 is a sectional view of an adjustable stop means for locating one of the gauging arms in a reference position.

Figure 11 is a detailed fragmentary front view of the adjustable stop and the surface with which it cooperates.

Figure 12 is a top view showing the manually actuated yoke which serves to position the gauge contact carrying arms.

Figure 13 is a detailed enlarged view of a latch means for locking the inner end of the arm positioning yoke in an up position to release the gauging arms.

Figure 14 illustrates an exemplary flow measuring instrument with calibrations thereon for a particular gauging operation.

The apparatus of this invention as applied to the comparison of a plurality of parts comprises support means which position each part for gauging and gauging contacts which are movable away from the part supports to allow the loading of parts and are movable toward the parts for contact therewith in a gauging operation. Each gauge contact is positioned in accordance with the dimension of its respective part and these gauge contacts serve to position gauging components which are thus relatively positioned in accordance with the differential in the dimensions of the parts irrespective of the sizes of the parts.

In gauging a single part or comparing a single part with a reference dimension one gauge component can be located in a fixed reference position through an adjustable stop or by the insertion of a part of reference dimension or the like and the other gauge component will be positioned in accordance with the location of its associated gauge contact as determined by the dimension of the part gauged.

Each of the part supports includes part locating contacts which are stationary during a gauging operation but which are readily adjustable to fixed positions in accordance with the size of the parts thus adapting the device for gauging parts of various sizes. In an illustrative embodiment of the device the gauge contacts are carried by arms which are pivoted about a common axis. A lever which is manually movable is provided to raise the arms out of gauging contact during loading and unloading of the gauging device and to release the arms for movement into contact with the parts gauged. The arms are suitably counterbalanced so that a predetermined gauging pressure can be provided. These arms carry the cooperating gauging components for movement towards and from one another in accordance with the differential in the dimensions of the parts or the dimension of the single part gauged. It has been found especially advantageous to employ as gauging components a fluid leakage orifice on one of the arms and an opposed orifice controlling surface on the other, the relative positioning of the orifice and the controlling surface controlling the amount of leakage flow through the orifice which is indicated by an associated flow measuring instrument.

In Figure 1 is illustrated a base member 10 which has three vertical standards or posts 11, 12 and 14 extending up from its upper surface. The two end posts 11 and 14 serve to carry the part supports. The central post 12 mounts the pivoted arms 15 and 16 and also carries the arm positioning yoke 17. The arms 15 and 16 carry gauge contacts 18 and 20 for movement about a common axis passing through the central post 12 and into and out of gauging contact with the parts to be gauged.

The particular embodiment illustrated is particularly adapted for the gauging and comparing of cooperating annular elements such as bearing races and more especially ball bearing races. It will be understood that while the apparatus illustrated is especially adapted for such gauging, other pairs of interrelated or cooperating parts could similarly be mounted and gauged with this apparatus.

Each part support includes two adjustably fixed part contacts for positioning the part for gauging. The left-hand post 11 carries contacts 21 and 22 and the right-hand post 14 carries contacts 24 and 25. Referring particularly to the post 14 and the contacts 24 and 25 carried thereby, a plate-like member 26 is fixed to the forward face of the post 11 by screws 27, 28 and 29. The forward face of the plate 26 has converging grooves along its outer edges. The section 9—9 (see Figure 9) illustrates the configuration of one of these grooves. Sliding blocks 30 and 31 can be adjustably fixed along these grooves and will converge with downward adjustments therealong. This association is shown for the block 31 in Figure 9. A screw 34 having a projecting head 35 which fits in a groove in the plate 26 can be tightened in position by nut 36 to fix the block 31 in its adjusted position along the plate. This gives a range of movement of each of the blocks along the length of the converging sides of the plate 26. The part contact 25 is shaped as a segment of a sphere in this application and has an inner flange 37 which engages the outer surface of the block 31. By rotating the contacts different wearing surfaces can be presented for contact to prolong their useful service life.

The part contact 25 is internally threaded at its inner end and a screw member 38 is provided to fix the part contact in either of two holes furnished along the length of the block 31. Thus with the adjustable sliding of each of the blocks 30 and 31 and the two points of attachment on each block for the part contacts 24 and 25 an extremely wide range of adjustments is readily and simply provided to accommodate the gauge for the gauging of parts of a wide range of sizes. The fixed mounting contacts 21 and 22 supported from the vertical post 11 at the left-hand end of the gauging apparatus are similarly arranged.

The two gauging arms 15 and 16 are carried for their pivoting movement about a common axis at the upper end of the central post 12 by structure which is more fully illustrated in Figure 4. Each of the arms are carried for pivoting movements at two points spaced along the pivot axis. The main bearing support is furnished by two relatively large ball elements at the forward and rearward faces of the central post 12 one of which, 40, is seen in Figure 4. This larger ball 40 contacts two clusters of smaller balls two of which are shown at 40 and 44 on each side of the ball 40. These ball clusters 42 and 44 are carried in plug-like members 45 and 46. The plug 45 is carried in a passage in the central post 12 and the plug 46 is carried in a forward projection of the right-hand arm 16. Each of these plugs 45 and 46 have annular V-shaped grooves in their surfaces into which the pointed ends of holding screws threaded in the post can be inserted to fix them in position. The forward support of the left-hand arm 15 is furnished by a plate 47 fixed to the arm 15 and having an extension which has a hole in which the large ball 40 is fitted. A similar ball and plug arrangement is provided at the rear end of the apparatus where a plate 48 is journaled about a corresponding ball and is fixed to the rear projection of the arm 16. A plug is carried in the rear end of the arm 15 and carries balls which similarly contact the rear face of the rear ball bearing support. Through this arrangement a minimum of friction surface is achieved with the elimination of lost motion or play. The spring 50 between the two central post supported ball cluster carrying plugs 45 and 49 is an aid in removing the plugs from the central post 12 in disassembling the apparatus.

The arm 16 which has its gauge contact 15 at its right-hand end is supported for pivoting movement at a point intermediate its ends and at its left-hand end carries a fluid leakage orifice 52 constituting one gauging component and formed as an insert in the upper surface of the left-hand end of the arm 15. A passage 54 leads to the orifice insert 52 and is provided for connection to a source of air supply and a fluid flow gauge. The gauge contact 20 of the arm 16 is counterbalanced by a counterweight formed integrally with the arm and indicated at 55.

The left-hand arm 15 has its gauge contact at its left-hand end and is journaled closely adjacent its right-hand end on the post 12 as previously described. Intermediate its ends this arm 15 carries an adjustable orifice controlling member 56 constituting the other gauging component threaded into an upper projection 57 on the arm. This orifice controlling member 56 has a lower surface opposing the fluid leakage orifice 52. The gauge contact 18 and the weight of the arm 15 is counterbalanced in a manner similar to that for arm 16 by a counterbalance 58.

Each of the arms 15 and 16 has an adjustable screw projection extending below the arm adjacent to its pivot axis and indicated at 60 and 61 respectively. The arm positioning yoke 17 is pivoted on a pin 64 which extends through the central post 12 transverse to the pivoting axis of the arms. This arrangement is shown more clearly in Figure 12. This yoke 17 is provided with contacting surfaces 65 and 66 for engaging the screws 60 and 61. At its forward end a handle 67 extends from the yoke 17 for manually actuating it.

A pin 70 extends transversely through the left-hand rear extension of the yoke 17. At the left-hand end of the pin 70 (see Figure 12) a spring is attached. This spring 71 extends down through the upper surface of the base 10 and is attached to a lower pin 74 inserted into a side wall of the base 10. This spring urges the rearward end of the yoke 17 down, thus raising the contacts 65 and 66 in engagement with the screws 60 and 61 and moving the arms and gauge contacts 18 and 20 out of gauging position. When the handle 67 is released it will move upward raising the gauge contacts 18 and 20 from the work parts being gauged and the operator's hands are free for removing the gauged parts and replacing them with parts to be gauged.

The right-hand end of the pin 70 is provided for cooperation with a latch member 75 which is moved by a small projecting lever 76 which extends out the back of the central housing 78. This is provided to lock the rear end of the yoke in an up position to face the arms during setup operations.

At the inner end of the lefthand rearward extension of the yoke 17 a projecting screw member 80 is provided. This screw 80 cooperates with a switch contact 81 of a switch unit 82. When the yoke 17 moves up it releases this contact 81 to energize the switch 82 and a solenoid vibrator unit 84 which vibrates the gauging apparatus insuring that the bearing races are settled on their supporting contacts.

Figures 5 and 6 show the apparatus in a gauging position and a loading position respectively. As shown in Figure 6, the handle 67 is raised and has contacted the screw projections 60 and 61 to carry the arms 15 and 16 upward, raising the gauge contacts 18 and 20 out of gauging contact so that parts can be easily mounted for gauging. As shown in phantom in that figure an inner bearing ring is supported at the left-hand side of the apparatus by mounting above the two fixed contacts 21 and 22. On the right-hand side an outer bearing ring is supported as by hanging about the fixed contacts 24 and 25. It will be noted that the orifice and the orifice controlling surface are spread some distance apart in this situation. In Figure 5 the handle 67 has been lowered and the gauge contacts 18 and 20 are contacting the outer surface of the inner ring and the inner surface of the outer ring respectively thus relatively positioning the orifice and orifice controlling surface in accordance with the dimensional relationship between these co-operating parts.

It will be apparent that this apparatus is subject to many applications. As applied to the gauging of bearing ring races with a quantity of inner and outer rings available they can be matched in pairs until a combination is obtained to be assembled with any given size of balls which are available. An inner ring or an outer ring of known race dimension could be mounted and the other component matched to it. By providing a reference inner or outer ring and leaving it mounted on the apparatus the other components can be respectively gauged. By rotating a part on its supports any condition of "cloverleaf" or other irregularity in contour can be readily detected. These are exemplary applications and others will be apparent to those skilled in the art.

In Figure 3 it will be noted that the post 14 has a forward projection having an upper surface 90. At the right-hand end of the arm 16 immediately below the gauge contact 20 is an opposing surface 91. These surfaces serve to limit the downward movement of the outer end of the arm 16 and also serve a setup function to be later described. Similar surfaces at the left-hand end of the apparatus serve the same purposes for the gauge contact 18. See 106 in Figure 11.

At the left-hand end of the arm 15 an adjustable stop structure 94 is also provided (see also Figures 11 and 10) which has particular utility in a unique gauging procedure also later described. A pin 97 is carried for axial sliding in a bushing 98 fitted in a rearward extension or projection 99 on the arm 15. At each end of the pin 97 are flanges 100 and 101 respectively. Spring like washer elements are fitted at 102 between the upper flange and the bushing 98 biasing the pin 97 upward. A ring-like member 104 having a slanted lower surface is journaled about the pin 97 and abuts the lower end of the bushing 98. The flange 101 carries a ball member 105 embedded and fixed in its upper surface for contacting the lower face of this member 104. It can be seen that by rotating the pin in the bushing 98 the downward projection thereof can be controlled and the position of this stop means relative to the arm 15 can be determined. Below the flange 101 is a stop projection 107 which cooperates with a carbide insert or the like 108 fitted in the upper surface of the part contact mounting plate supported from the left-hand post 11.

This gauging apparatus is commonly used with a commercially available flow measuring instrument, such as that indicated at 96 in Figure 14, attached to the connection to the passage 54 leading to the leakage orifice 52, the instrument being provided with indicator positioning adjustment means and an amplification adjustment. In an instrument such as that of Figure 14 a float positions itself along an internally tapered transparent tube in accordance with the fluid flow therethrough as controlled by the particular air gauging apparatus to which the instrument is connected.

In one method for setting up the apparatus for determining the size differential between inner and outer bearing ring races reference gauge block buildups are inserted between the fixed stop surfaces at the outer ends of the gauge arms 15 and 16 to position the gauge arms in reference positions. The handle 67 meanwhile has been moved down and locked in its down position by the latch 75 thus releasing the arms. The adjustable part contacts 21, 22, 24 and 25 are then positioned for the size of the particular bearing races to be gauged and fixed in those positions. The blocks are removed, the handle raised, and inner and outer rings having nominal race dimensions are mounted on the apparatus. The contacts 18 and 20 are then lowered into contact with these races. While the contacts are in contact with the races a reference gauge block of predetermined thickness is inserted between the shoulder on the orifice controlling member 56 and the face of the fluid leakage orifice insert 52 and the member 56 is adjusted in the supporting projection 57 to close about this block to give a predetermined orifice clearance with the mean races in position and the instrument indicator is properly positioned. Following this, minimum and maximum dimensional inner and outer ring races can be used to set and check the amplification of the instrument and set tolerance limit indicators thereon if desired.

It will be understood from the foregoing apparatus description that each of the contacts 18 and 20 directly engage one of the parts and is positioned in accordance with the cooperating dimension of that part. The gauging components 52 and 56 are then relatively positioned for gauging the dimensional relationship between these co-operating dimensions. Accordingly, it is not the particular dimension of either part which is gauged but the dimensional relationship therebetween as, for example, the variations for a nominal relationship between the two parts. In its specific application to ball bearing races the associated instrument can be calibrated and adjusted to indicate the particular ball size which will properly assemble with the races matched or to indicate the radial play of the assembled bearing when the gauged races are assembled with a given ball size, as examples. In the specific example illustrated the gauge contact carrying arms 15 and 16 are pivoted about a common axis between the race supports. When the gauge contact at the right-hand end of the apparatus moves into contact with the outer race it raises the orifice 52 which is carried to the left of the pivot axis. The movement of the left-hand contact into contact with the inner race lowers the orifice controlling surface 56 which opposes the orifice. However, for example, if both races are increased in size equally both the orifice and orifice controlling surface will be positioned upwardly in equal amounts and there will be no change in the instrument indication. Thus it is seen that it is the dimensional relationship which is gauged rather than the absolute dimension of either part.

The adjustable stop 94 has particular utility in a unique gauging method employing the apparatus of this invention and the specially calibrated flow measuring instrument 96 indicated in Figure 14. This method as such is more fully described and is claimed in my copending application, Serial No. 389,734, filed November 2, 1953. One specific application of this method as applied to the manufacturing, gauging and assembly of precision ball bearings will be described. Outer bearing rings are manufactured with their races held within a tolerance range but are not previously segregated into classified steps. Inner ring races are pre-gauged and the rings classified in accordance with their race dimensions into a few steps spanning their tolerance range as indicated by the calibrations 1 to 5 on the instrument 96. The balls to be used with these races are also pre-gauged and classified into a few groups and these ball classifications are shown on the instrument at A, B, C and D. In practice the adjustable stop 94 is adjusted to limit the downward movement of the left-hand arm 15 at a reference position closely adjacent the position of the contact 18 when in engagement with an inner ring race at one limit of the race tolerance range. A random outer ring is placed on the right-hand part contacts and the gauge contacts 18 and 20 are lowered until the left-hand arm 15 reaches its adjusted stop position and the right hand contact 20 is positioned in accordance with the dimension of the race of the random taken outer bearing ring. The instrument 96 will then indicate the classification of inner ring to be selected to be used with this outer. An inner ring is taken from this previously classified group and is placed on the left-hand fixed contacts 21 and 22 and the gauge contacts 18 and 20 are lowered into contact with the races of the selected inner ring and the same random outer ring. The only variation from a desired relationship which could exist between these races is that within the range of an inner race classification. When the gauge contacts 18 and 20 contact the selected inner race and the random outer race the float in the indicating instrument 96 of Figure 14 will then indicate from which of the ball classifications A, B, C, or D balls should be selected to assemble with this combination of inner and outer rings. These classifications have been set up so as to properly compensate for any existing variation between the selected inner and random outer races and give the desired radial play in the assembled bearing. Thus in this exemplary application an inner ring is selected to go with a random selected outer ring, the selected inner ring and random outer ring are compared, and balls are selected to assemble therewith.

Thus it is seen that a gauging apparatus has been provided which can readily gauge a single part or can determine the dimensional relationship between cooperating parts. The apparatus has many other applications than that of gauging bearing components and can be readily applied to gauging the dimensional relationship between any two related parts. It embodies adjustable part supports whereby parts of various sizes can be accommodated. The apparatus is easily operated by an inexperienced operator. When used with properly calibrated instruments for specific gauging operations there are no mental calculations to be carried out. When the handle 67 is raised the part gauging contacts are moved out of position and the apparatus is clear and free for the removal of parts which have been gauged and the insertion of parts which are to be gauged. The structure is basically simple in form and ruggedly constructed and is designed to have a long service life. The gauge contacts, being counterbalanced, will only have a light gauging contact and therefore there will be slight wear on these contacts and no possibility of damage to the parts being gauged. By rotating the part contacts in their supporting blocks after several gauging operations the point of contact can be varied along their peripheries and their life thus lengthened.

While a specific embodiment of this invention has been illustrated and described for the purpose of disclosing the many advantages and the operation thereof, it is not intended to so limit the scope of this invention. The true scope of the invention is determined by the appended claims.

We claim:

1. Gauging apparatus for gauging a dimensional relationship between a pair of cooperating annular parts which are adapted to cooperate one within the other, comprising a base, a first support for the inner part carried from said base, said first support comprising two spaced supporting and locating contacts engaging the inner part at two points upon its outer surface, carrying the part thereabove, a second support for the outer part carried from said base, spaced laterally from said first support, said second support comprising two spaced supporting and locating contacts engaging the outer part at two points on its inner surface and upon which the outer part is supported by hanging, a first gauge contact means for contacting the outer surface of the inner part at a point equidistant from the supporting and locating contacts, means carrying said first contact means from said base for movement into and out of contact with the inner part by pivoting about an axis intermediate the first and second support means, a second gauge contact means for contacting the inner surface of the outer part, means carrying said second contact means from said base for movement into and out of contact with the outer part at a point equidistant from the associated supporting and locating contacts by pivoting about said intermediate axis, manually operated means carried from said base for moving said gauge contact means into and out of gauging position, and cooperating gauging components on said carrying means at one side of said intermediate axis relatively positioned in accordance with the movement of the gauge contacts and the dimensional relationship of the inner and outer parts.

2. Gauging apparatus for gauging a dimensional relationship between a pair of cooperating annular parts which are adapted to cooperate one within the other, comprising a base, a first support for the inner part carried from said base, said first support comprising supporting contact means engaging the inner part on its outer surface and carrying the part thereabove, a second support for the outer part carried from said base, spaced laterally from said first support, said second support comprising supporting contact means engaging the outer part on its inner surface and upon which the outer part is supported by hanging, a first gauge contact means for contacting the outer surface of the inner part at a point opposite the associated supporting contact means, means carrying said first gauge contact means from said base for movement into and out of contact with the inner part by pivoting about an axis intermediate the first and second support means, a second gauge contact means for contacting the inner surface of the outer part, means carrying said second gauge contact means from said base for movement into and out of contact with the outer part at a point opposite the associated supporting contact means by pivoting about said intermediate axis, actuating means for moving said gauge contact means into gauging position and for retracting and holding said gauge contact means away from gauging position, cooperating gauging components on said carrying means at one side of said intermediate axis relatively positioned in accordance with the movement of the gauge contact means and the dimensional relationship of the inner and outer parts, said carrying means including a first rigid gauging arm pivotally supported between its ends on said pivot axis carrying one of said contact means at one end and having one of said gauging components at its other end, and a second rigid gauging arm pivotally supported at one end on said pivot axis carrying the other of said contact means at its other end and having the other of said gauging components between its ends in cooperation with the gauging component supported by said first arm.

3. Gauging apparatus for gauging a dimensional relationship between a pair of cooperating annular parts which are adapted to cooperate one within the other, comprising a base, a first support for the inner part carried from said base, said first support comprising supporting contact means engaging the inner part on its outer surface and carrying the part thereabove, a second support for the outer part carried from said base, spaced laterally from said first support, said second support comprising supporting contact means engaging the outer part on its inner surface and upon which the outer part is supported by hanging, a first gauge contact means for contacting the outer surface of the inner part at a point opposite the associated supporting contact means, means carrying said first gauge contact means from said base for movement into and out of contact with the inner part by pivoting about an axis intermediate the first and second support means, a second gauge contact means for contacting the inner surface of the outer part, means carrying said second gauge contact means from said base for movement into and out of contact with the outer part at a point opposite the associated supporting contact means by pivoting about said intermediate axis, cooperating gauging components on said carrying means at one side of said intermediate axis relatively positioned in accordance with the movement of the gauge contact means and the dimensional relationship of the inner and outer parts, said carrying means including a first rigid gauging arm pivotally supported between its ends on said pivot axis carrying one of said contact means at one end and having one of said gauging components at its other end, a second rigid gauging arm pivotally supported at one end on said pivot axis carrying the other of said contact means at its other end and having the other of said gauging components between its ends in cooperation with the gauging component supported by said first arm, manually actuated means for moving said gauge contact means into gauging position and for retracting and holding said gauge contact means away from gauging position including actuating means for engaging both said arms, resilient means connected to bias said actuating means in one direction to engage and rock said arms to retract said gauge contact means from gauging position, and manually operated means connected to move said actuating means in the opposite direction to release said arms and allow engagement of said gauge contact means with the respective parts under the force of gravity.

References Cited in the file of this patent

UNITED STATES PATENTS

| | | |
|---|---|---|
| 1,274,331 | Rockwell | July 30, 1918 |
| 1,652,435 | Goodrich | Dec. 13, 1927 |
| 2,372,427 | Johnson | Mar. 27, 1945 |
| 2,407,490 | Gregg | Sept. 10, 1946 |
| 2,427,924 | Rose | Sept. 23, 1947 |
| 2,433,421 | Bowness | Dec. 30, 1947 |
| 2,490,376 | Rupley | Dec. 6, 1949 |
| 2,623,293 | Nebesar | Dec. 30, 1952 |
| 2,675,621 | Mims | Apr. 20, 1954 |
| 2,675,622 | Aller | Apr. 20, 1954 |
| 2,686,370 | Walker | Aug. 17, 1954 |

FOREIGN PATENTS

| | | |
|---|---|---|
| 565,881 | Great Britain | Dec. 1, 1944 |

OTHER REFERENCES

American Machinist, page 383, February 27, 1930.